(12) United States Patent
Albert, III

(10) Patent No.: US 8,006,465 B1
(45) Date of Patent: Aug. 30, 2011

(54) STORAGE CONTAINER FOR WATER FOWL DECOYS AND METHOD OF USE

(76) Inventor: Roosevelt A. Albert, III, Auburn, AL (US)

( * ) Notice: Subject to any disclaimer, the term of this patent is extended or adjusted under 35 U.S.C. 154(b) by 287 days.

(21) Appl. No.: 12/498,540

(22) Filed: Jul. 7, 2009

Related U.S. Application Data

(60) Provisional application No. 61/079,235, filed on Jul. 9, 2008.

(51) Int. Cl.
*B65B 35/56* (2006.01)

(52) U.S. Cl. .................. 53/443; 53/413; 53/428

(58) Field of Classification Search ............ 206/315.11; D3/254, 260, 904, 304, 305, 307; 53/428, 53/429, 430, 443, 444, 446, 413
See application file for complete search history.

(56) References Cited

U.S. PATENT DOCUMENTS

| | | | | |
|---|---|---|---|---|
| 1,725,864 A | * | 8/1929 | James ................................ 43/55 |
| 2,962,187 A | * | 11/1960 | Morris .......................... 220/780 |
| 3,766,954 A | * | 10/1973 | Gentellalli .................... 150/154 |
| 5,251,460 A | * | 10/1993 | DeMarco et al. ............... 62/371 |
| 5,490,619 A | * | 2/1996 | Boyar ........................... 224/153 |
| D387,555 S | * | 12/1997 | Miller ............................ D3/244 |
| D393,364 S | * | 4/1998 | John .............................. D3/221 |
| D437,481 S | * | 2/2001 | Vazquez ........................ D3/244 |
| 6,186,662 B1 | * | 2/2001 | Jackson ......................... 383/16 |
| D456,605 S | * | 5/2002 | Vazquez ........................ D3/244 |
| 6,435,391 B1 | * | 8/2002 | Vazquez ....................... 224/656 |
| D470,910 S | * | 2/2003 | Abel ............................. D22/199 |
| 6,595,687 B2 | * | 7/2003 | Godshaw et al. ................ 383/6 |
| 6,662,488 B1 | * | 12/2003 | Heimbrock et al. ............. 43/55 |
| 6,830,170 B2 | * | 12/2004 | Abel ............................. 224/634 |
| 7,036,699 B1 | * | 5/2006 | Hay et al. ...................... 224/407 |
| 7,441,366 B2 | * | 10/2008 | Van Houten, II et al. .......... 43/3 |
| 7,503,695 B2 | * | 3/2009 | Anderson ....................... 383/33 |
| 2001/0017307 A1 | * | 8/2001 | Bentzen ........................ 224/634 |

* cited by examiner

*Primary Examiner* — Paul Durand
(74) *Attorney, Agent, or Firm* — Kenneth M. Bush; Bush Intellectual Property Law

(57) ABSTRACT

The invention comprises a storage container preferably having four sides, an open top end, a bottom end having an opening therethrough, and at least two handles preferably located on opposing sides of the container. In use, the storage container is preferably used with water fowl decoys having flexible monofilament lines with looped ends attached thereto. The container is preferably held upside down and the flexible lines of the decoys are passed into the container from underneath and the looped ends are pulled through the opening. The decoys are then pulled into the container. The container is then turned over and the handles are pulled together. The lines of the decoys are pulled over the top end of the container and the looped ends of the lines can be fastened to the handles with a clip. The decoys can then be conveniently transported and stored in the container.

1 Claim, 3 Drawing Sheets

STORAGE CONTAINER FOR WATER FOWL DECOYS AND METHOD OF USE

CROSS-REFERENCE TO RELATED PATENT APPLICATION

The present application claims priority to U.S. Provisional Patent Application No. 61/079,235, filed Jul. 9, 2008, the disclosure of which is incorporated herein by reference.

FIELD OF THE INVENTION

The present invention is directed to hunting accessories, and more particularly, to a storage container for storing and transporting water fowl decoys and a method of using the container.

BACKGROUND OF THE INVENTION

Water fowl decoys are commonly used to attract game animals, such as ducks or geese, to a body of water in proximity to a hunter. To attract the game animals, a plurality of decoys are typically set upon the surface of the water in proximity to each other. Each decoy typically has a monofilament line attached to a bottom portion thereof with the opposing end of the monofilament line having a looped end for securing the decoy and thereby preventing the decoy from floating away. To transport and store the decoys, a hunter typically uses a flexible bag or container to hold the decoys with attached monofilament lines. Because of the number of decoys typically used, the monofilament lines tend to become entangled with each other and the decoys, thus creating a problem with their use. As a result, there is a need for a storage container specifically designed for storing and transporting water fowl decoys and a method of using the container.

SUMMARY OF THE INVENTION

The invention comprises a storage container preferably having four sides, an open top end, and a bottom end having an opening therethrough. The container has at least two handles, preferably located on opposing sides of the container. In use, the storage container is preferably used with water fowl decoys each having flexible monofilament lines with looped ends attached thereto. The container is preferably held upside down and the lines of the decoys are passed into the container from underneath and the looped ends are pulled through the opening. The decoys are then pulled into the container. The container is then turned over and the handles are pulled together. The lines of the decoys are pulled over the top end of the container and the looped ends of the lines can be fastened to the handles with a clip. The decoys can then be conveniently transported and stored in the container.

These and other features of the invention will become apparent from the following detailed description of the invention.

DETAILED DESCRIPTION OF THE INVENTION

Figure 1:
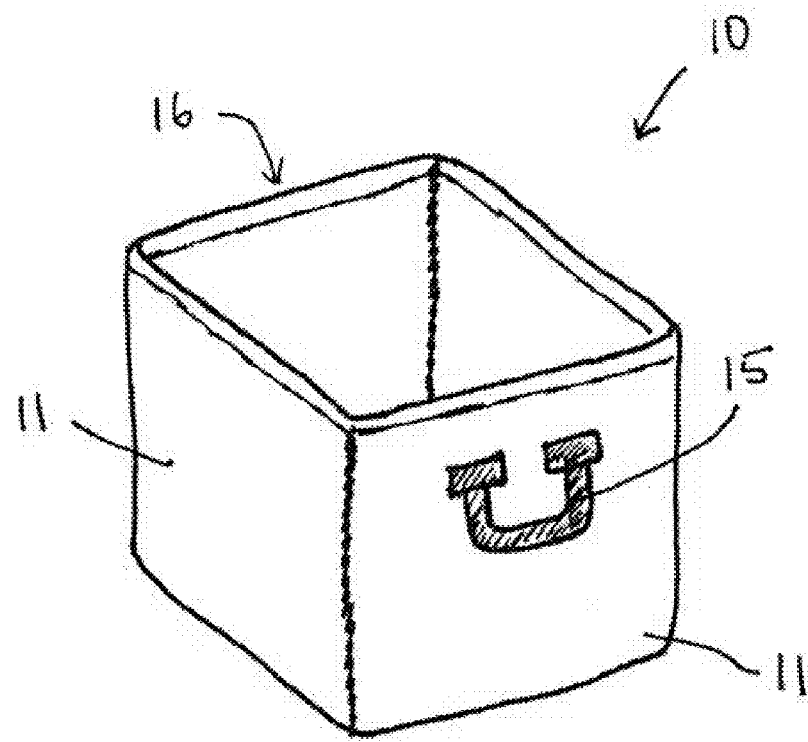
FIG. 1 is a top perspective view of the preferred embodiment of the present invention.
Figure 2:
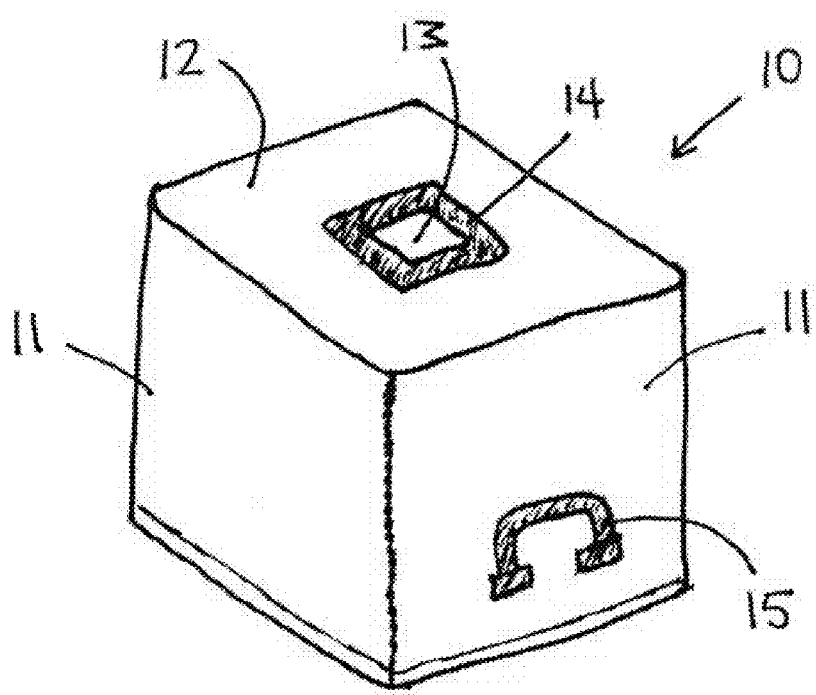
FIG. 2 is a bottom perspective view of the embodiment shown in FIG. 1.

The preferred embodiment of the present invention is shown in FIGS. 1-4, wherein the invention comprises a storage container 10 preferably having four (4) sides 11, an open top end 16, and a bottom end 12 having an opening 13 therethrough, wherein the opening 13 is preferably surrounded by a border 14 of reinforcement material. The container 10 has at least two (2) handles 15, preferably located on opposing sides of the container 10. The container 10 is preferably made from a flexible, breathable material, such as vinyl-coated polypropylene netting. The border 14 and the handles 15 are preferably made from flexible webbing, such as nylon webbing.

EXAMPLE

A vinyl-coated polypropylene netting is cut and sewn in a manner that forms a storage container 10 that is 18 inches tall with a 24 inch diameter open top end. The bottom end 12 of the storage container 10 has a 1.5 inch diameter opening 13. The opening 13 is reinforced with a 2 inch webbing border 14. A one inch hem is placed in proximity to the top edges of the container 10 around the opening. Two handles 15 are formed by placing 2 inch webbing in half circles on opposing sides 11 of the container 10 and then sewn in place.

Figure 3:
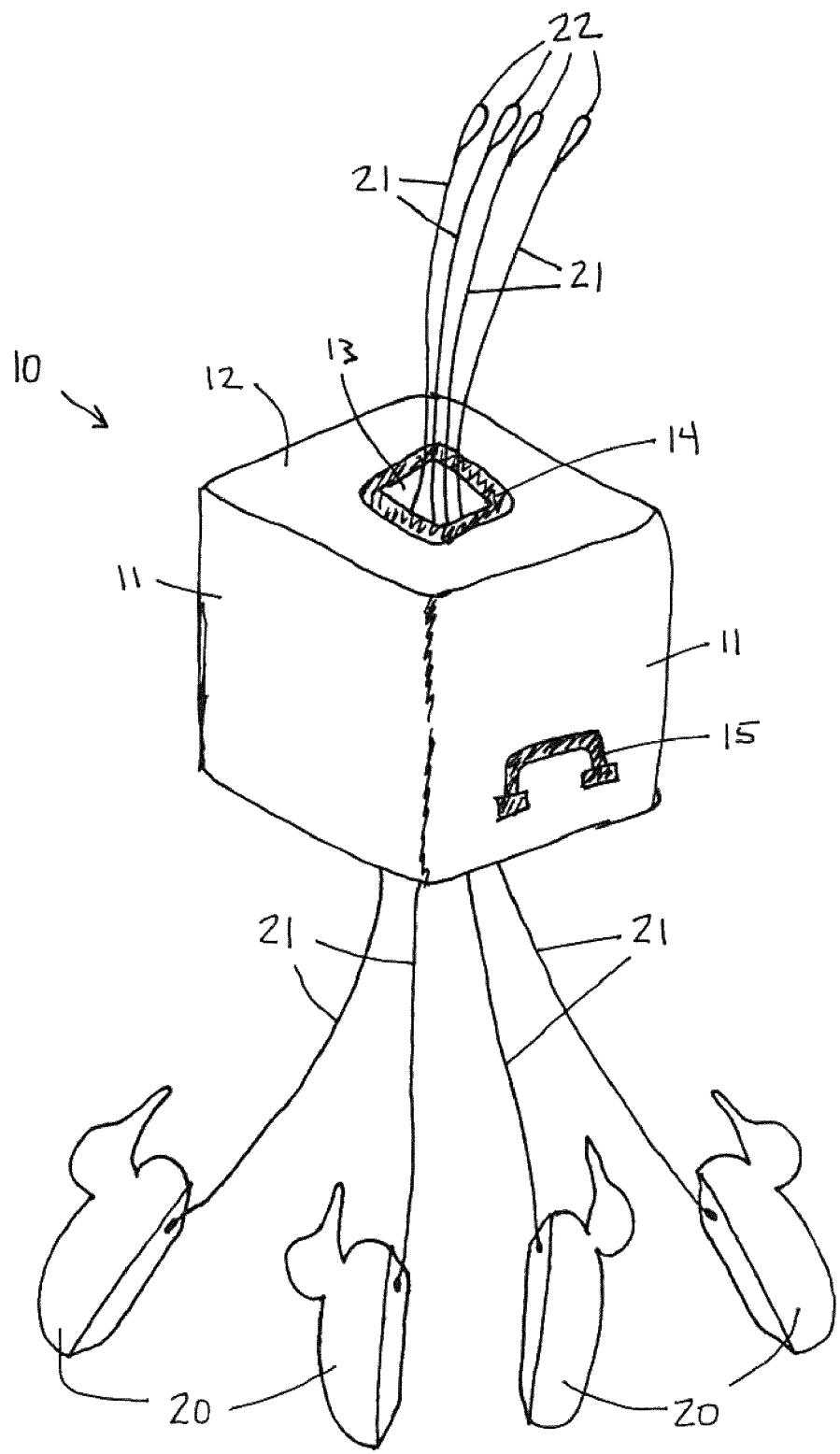
FIG. 3 is a bottom perspective view of the embodiment shown in FIG. 1 with a plurality of water fowl decoys being pulled into the storage container.
Figure 4:
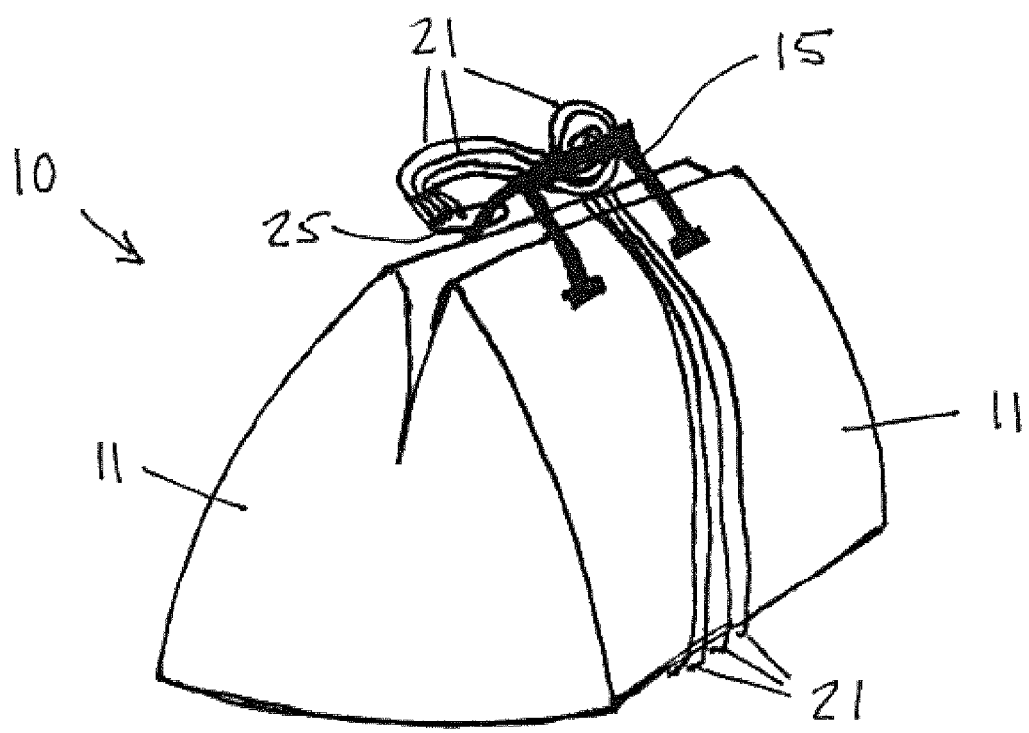
FIG. 4 is a top perspective view of the embodiment shown in FIG. 3 with the water fowl decoys secured within the storage container.

In operation, the storage container 10 is preferably used with water fowl decoys 20 each preferably having flexible monofilament lines 21 attached thereto. The container 10 is preferably held upside down, as shown in FIG. 3. The lines 21 of the decoys 20 are passed into the container 10 from underneath and the looped ends 22 are pulled through the opening 13. The decoys 20 are then pulled into the container 10. The container 10 is then turned over and the handles 15 are pulled together. The lines 21 of the decoys 20 are pulled over the top end of the container 10 and the looped ends 22 of the lines 21 can be fastened to the handles 15 with a clip 25, such as a carabiner clip, as shown in FIG. 4. The decoys 20 can then be conveniently transported and stored in the container 10.

While the invention has been shown and described in some detail with reference to a specific exemplary embodiment, there is no intention that the invention be limited to such detail. On the contrary, the invention is intended to include any alternative or equivalent embodiments that fall within the spirit and scope of the invention as claimed. For example, the container 10 can be made of other flexible materials and have various shapes and sizes, and the flexible lines 21 can be any appropriate string, cable, wire, or the like.

The invention claimed is:

1. A method for securing a plurality of water fowl decoys in a container for storage and transport, wherein said container comprises four sides, an open top end, a bottom end having an opening therethrough, and at least two handles located on opposing sides of said container, and wherein each decoy has a first end of a flexible line attached thereto, said method comprising the steps of:

a. passing a second end of each said flexible line into said container through said open top end and through said opening through said bottom end so that said second end of each said flexible line is outside of said container;

b. pulling said second end of each said flexible line through said bottom end of said container until each said decoy and each said first end of said flexible line is secured within said container;

c. bringing said handles into abutment with each other; and d. attaching each said second end of each said flexible line to at least one of said handles.

\* \* \* \* \*